United States Patent
Nishizaka et al.

(10) Patent No.: US 9,615,027 B2
(45) Date of Patent: Apr. 4, 2017

(54) IMAGE PROCESSING APPARATUS THAT DISPLAYS AN INDICATOR IMAGE FOR PERFORMING PREDETERMINED PROCESSING ON IMAGE DATA, IMAGE PROCESSING METHOD, AND COMPUTER READABLE STORAGE MEDIUM

(71) Applicant: CASIO COMPUTER CO., LTD., Shibuya-ku, Tokyo (JP)

(72) Inventors: Nobuyoshi Nishizaka, Setagaya-ku (JP); Yoshinori Tomidokoro, Higashimurayama (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/860,523

(22) Filed: Sep. 21, 2015

(65) Prior Publication Data
US 2016/0142638 A1   May 19, 2016

(30) Foreign Application Priority Data
Nov. 14, 2014 (JP) .................................. 2014-232168

(51) Int. Cl.
*H04N 5/232* (2006.01)
*G06T 1/00* (2006.01)
(Continued)

(52) U.S. Cl.
CPC ....... *H04N 5/23293* (2013.01); *G06T 1/0007* (2013.01); *H04N 5/23229* (2013.01);
(Continued)

(58) Field of Classification Search
CPC .............. G06T 1/0007; H04N 5/23229; H04N 5/23293
See application file for complete search history.

(56) References Cited

U.S. PATENT DOCUMENTS 8,856,656 B2 * 10/2014 Chao ..................... G06F 3/0481
   715/716
2011/0019027 A1 * 1/2011 Fujita ........................ G06T 7/20
   348/222.1
(Continued)

FOREIGN PATENT DOCUMENTS

JP         2011120279 A      6/2011

*Primary Examiner* — Amy Hsu
(74) *Attorney, Agent, or Firm* — Holtz, Holtz & Volek PC

(57) ABSTRACT

Problem: To simplify an operation for causing an apparatus to perform desired control.

Solution to Problem: In an image capturing apparatus 1, an image capturing unit 16 continuously captures an image of a subject and sequentially outputs image data. An image analysis unit 53 determines whether or not there is an instruction regarding storage of the image data outputted by the image capturing unit 16. A storage control unit 56 carries out control to store the image data outputted from the image capturing unit 16 in a storage unit 19 upon it being determined that there is an instruction regarding storage. An output control unit 51 carries out control to display, in an output unit 18, a live view image corresponding to the image data sequentially outputted by the image capturing unit 16 along with a first indicator image for processing the stored image data. An image analysis unit 53 determines whether or not a position of the image of the subject in the live view image displayed in the output unit 18 overlaps with a position of the first indicator image, and when it is determined that the images overlap, predetermined processing is carried out on the image data stored in the storage unit 19.

20 Claims, 6 Drawing Sheets

(51) Int. Cl.
*H04N 5/77* (2006.01)
*H04N 5/783* (2006.01)

(52) U.S. Cl.
CPC ......... *H04N 5/23245* (2013.01); *H04N 5/772* (2013.01); *H04N 5/783* (2013.01)

(56) References Cited

U.S. PATENT DOCUMENTS

| | | | | |
|---|---|---|---|---|
| 2011/0050915 A1* | 3/2011 | Wang | ...... | H04N 5/232 348/207.99 |
| 2011/0221948 A1* | 9/2011 | Saito | ...... | G06F 3/0488 348/333.01 |
| 2013/0083222 A1* | 4/2013 | Matsuzawa | ...... | H04N 5/23212 348/240.3 |
| 2015/0055006 A1* | 2/2015 | Kim | ...... | H04N 5/23212 348/333.11 |

\* cited by examiner

IMAGE PROCESSING APPARATUS THAT DISPLAYS AN INDICATOR IMAGE FOR PERFORMING PREDETERMINED PROCESSING ON IMAGE DATA, IMAGE PROCESSING METHOD, AND COMPUTER READABLE STORAGE MEDIUM

CROSS-REFERENCE TO RELATED APPLICATIONS

This application is based upon and claims the benefit of priority under 35 USC 119 of Japanese Patent Application No. 2014-232168 filed on Nov. 14, 2014 the entire disclosure of which, including the description, claims, drawings, and abstract, is incorporated herein by reference in its entirety.

BACKGROUND OF THE INVENTION

1. Field of the Invention

The present invention relates to image processing apparatuses, image processing methods, and programs.

2. Description of the Related Art

Japanese Unexamined Patent Application Publication No. 2011-120279A describes technology in which a user selects an image to be sent from a list and control is carried out to send the image to an external apparatus.

BRIEF SUMMARY OF THE INVENTION

An image processing apparatus according to the present invention includes:
  an image capturing unit that continuously captures an image of a subject and sequentially outputs image data;
  a first determination unit that determines whether or not there is an instruction regarding storage of the image data in a storage unit;
  a storage control unit that carries out control to store the image data in the storage unit upon the first determination unit determining that there is an instruction regarding storage in the storage unit;
  a first display control unit that, in response to the instruction regarding storage, carries out control to display, in a display unit, a live view image corresponding to the image data sequentially outputted by the image capturing unit along with a first indicator image for performing predetermined processing on the image data;
  a second determination unit that determines whether or not a position of the image of the subject in the live view image overlaps with a position of the first indicator image; and
  a processing unit that carries out the predetermined processing on the image data when the second determination unit has determined that the position of the image of the subject overlaps with the position of the first indicator image.

An image processing method according to the present invention is
  an image processing method executed by an image processing apparatus including an image capturing unit that continuously captures an image of a subject and sequentially outputs image data, a storage unit, and a display unit, the method including:
  a first determination step of determining whether or not there is an instruction regarding storage of the image data outputted by the image capturing unit in the storage unit;
  a storage control step of carrying out control to store the image data in the storage unit upon it being determined in the first determination step that there is the instruction regarding storage in the storage unit;
  in response to the instruction regarding storage, a first display control step of carrying out control to display, in the display unit, a live view image corresponding to the image data sequentially outputted by the image capturing unit along with a first indicator image for performing predetermined processing on the image data;
  a second determination step of determining whether or not a position of the image of the subject in the live view image overlaps with a position of the first indicator image; and
  a processing step of carrying out the predetermined processing on the image data when it has been determined in the second determination step that the position of the image of the subject overlaps with the position of the first indicator image.

A program according to the present invention causes
a computer controlling an image processing apparatus that includes an image capturing unit that continuously captures an image of a subject and sequentially outputs image data, a storage unit, and a display unit, to function as:
  a first determination unit that determines whether or not there is an instruction regarding storage of the image data outputted by the image capturing unit in the storage unit;
  a storage control unit that carries out control to store the image data in the storage unit upon the first determination unit determining that there is the instruction regarding storage in the storage unit;
  a first display control unit that, in response to the instruction regarding storage, carries out control to display, in the display unit, a live view image corresponding to the image data sequentially outputted by the image capturing unit along with the first indicator image;
  a second determination unit that determines whether or not a position of the image of the subject in the live view image overlaps with a position of the first indicator image; and
  a processing unit that carries out the predetermined processing on the image data when the second determination unit has determined that the position of the image of the subject overlaps with the position of the first indicator image.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments of the present invention will be explained with reference to the drawings.

Hereinafter, embodiments of the present invention will be described with reference to the drawings.

Figure 1:
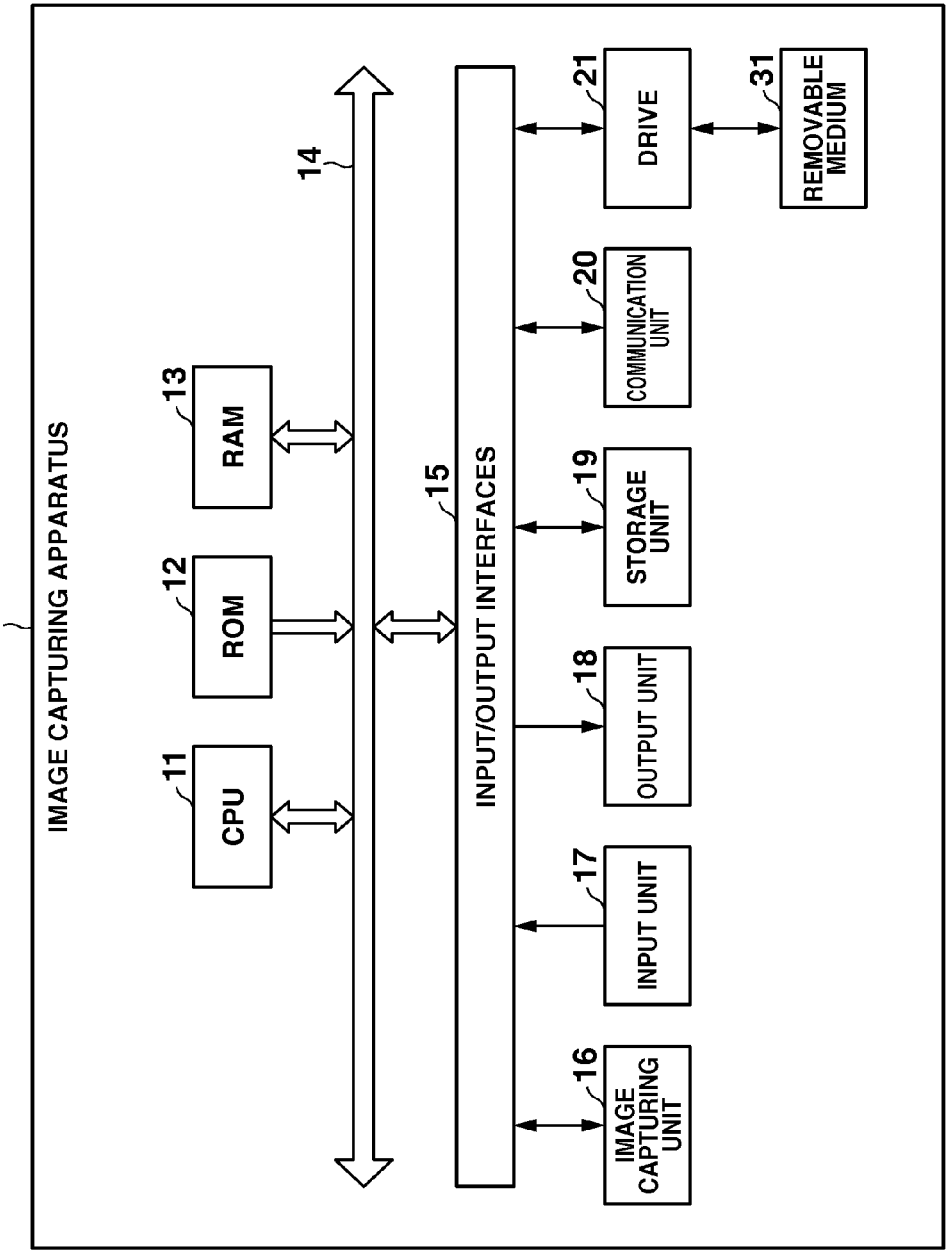
FIG. 1 is a block diagram illustrating the hardware configuration of an image capturing apparatus according to an embodiment of an image processing apparatus according to the present invention.

FIG. 1 is a block diagram illustrating the hardware configuration of an image capturing apparatus 1 according to an embodiment of an image processing apparatus according to the present invention.

The image capturing apparatus 1 is configured as a digital camera, for example.

The image capturing apparatus 1 includes a CPU (Central Processing Unit) 11, a ROM (Read-Only Memory) 12, a RAM (Random Access Memory) 13, a bus 14, input/output interfaces 15, an image capturing unit 16, an input unit 17, an output unit 18, a storage unit 19, a communication unit 20, and a drive 21.

The CPU 11 executes various types of processes in accordance with programs recorded in the ROM 12 or programs loaded from the storage unit 19 into the RAM 13.

Data and the like necessary for the CPU 11 to execute various types of processes is also stored in the RAM 13 as appropriate.

The CPU 11, the ROM 12, and the RAM 13 are connected to each other by the bus 14.

The input/output interfaces 15 are also connected to the bus 14. The image capturing unit 16, the input unit 17, the output unit 18, the storage unit 19, the communication unit 20, and the drive 21 are connected to the input/output interfaces 15.

Although not illustrated in the drawings, the image capturing unit 16 includes an optical lens unit and an image sensor.

The optical lens unit is constituted of lenses that focus light, for example a focus lens, a zoom lens, and the like, in order to capture an image of a subject.

The focus lens is a lens for forming a subject image on a light-receiving surface of the image sensor. The zoom lens is a lens that freely changes a focal length across a set range.

The optical lens unit is also provided with peripheral circuitry that adjusts setting parameters such as focus, exposure, white balance, and the like as necessary.

The image sensor is constituted of a photoelectric conversion element, an AFE (Analog Front End), and the like.

The photoelectric conversion element is constituted of a CMOS (Complementary Metal Oxide Semiconductor) photoelectric conversion element or the like, for example. The subject image is incident on the photoelectric conversion element from the optical lens unit. Accordingly, the photoelectric conversion element photoelectrically converts (captures) the subject image, accumulates a resulting image signal for a set amount of time, and sequentially supplies the accumulated image signal to the AFE as an analog signal.

The AFE executes various types of signal processes, such as an A/D (Analog/Digital) conversion process and the like, on this analog image signal. A digital signal is generated by the various types of signal processes, and is outputted as an output signal of the image capturing unit 16.

Such an output signal of the image capturing unit 16 will be called "captured image data" hereinafter. The captured image data is supplied to the CPU 11 and the like as appropriate.

The input unit 17 is constituted of various types of buttons and the like, and inputs various types of information in response to user instruction operations.

The output unit 18 is constituted of a display, a speaker, or the like, and outputs images, audio, or the like.

The storage unit 19 is constituted of a hard disk or a DRAM (Dynamic Random Access Memory) or the like, and stores various types of image data.

The communication unit 20 controls communication carried out with another apparatus (not illustrated) over networks including the Internet.

A removable medium 31 configured of a magnetic disk, an optical disk, a magneto-optical disk, a semiconductor memory, or the like is mounted in the drive 21 as appropriate. A program read out from the removable medium 31 by the drive 21 is installed in the storage unit 19 as necessary. The removable medium 31 can, like the storage unit 19, store various types of data such as image data stored in the storage unit 19.

In the image capturing apparatus 1 configured in this manner, an indicator image (called a "grid image" hereinafter) corresponding to the shape of a predetermined subject is displayed when a specific moving picture storage mode (an automatic movie cut mode, in the present embodiment) is set. When a predetermined operation (a shutter button being pressed halfway, a movie button being pressed, or the like) is made, an indicator image for instructing a moving picture to be recorded in response to a gesture (a second indicator image) (called a "moving picture storage icon" hereinafter) is displayed, and the apparatus enters a standby state for moving picture storage. Then, when the grid image or the moving picture storage icon overlaps with an image of the subject, or when the moving picture storage icon has been touched, a high-speed moving picture is stored for a set amount of time (five seconds, for example) after an amount of time set in a timer has elapsed (after ten seconds, for example). Upon the storage of the high-speed moving picture ending, a period of a predetermined action (for example, from immediately before to immediately after a golf club hits a ball in a golf swing, or from the address to the finish of a golf swing) is left, and the moving picture before and after the period of the predetermined action is cut automatically. Upon the cutting of the moving picture ending, an indicator image for playing back the moving picture (a first indicator image) (called a "playback icon" hereinafter) or an indicator image for sending the moving picture (a first indicator image) (called a "sending icon" hereinafter) is displayed in accordance with the settings. When the playback icon overlaps with an image of the subject, or when the playback icon has been touched, the cut high-speed moving picture is played back (fast-forward playback, for example). Meanwhile, when the sending icon overlaps with the image of the subject, or when the sending icon has been touched, the cut high-speed moving picture is sent to an external device (a smartphone or the like, for example).

Figure 2:
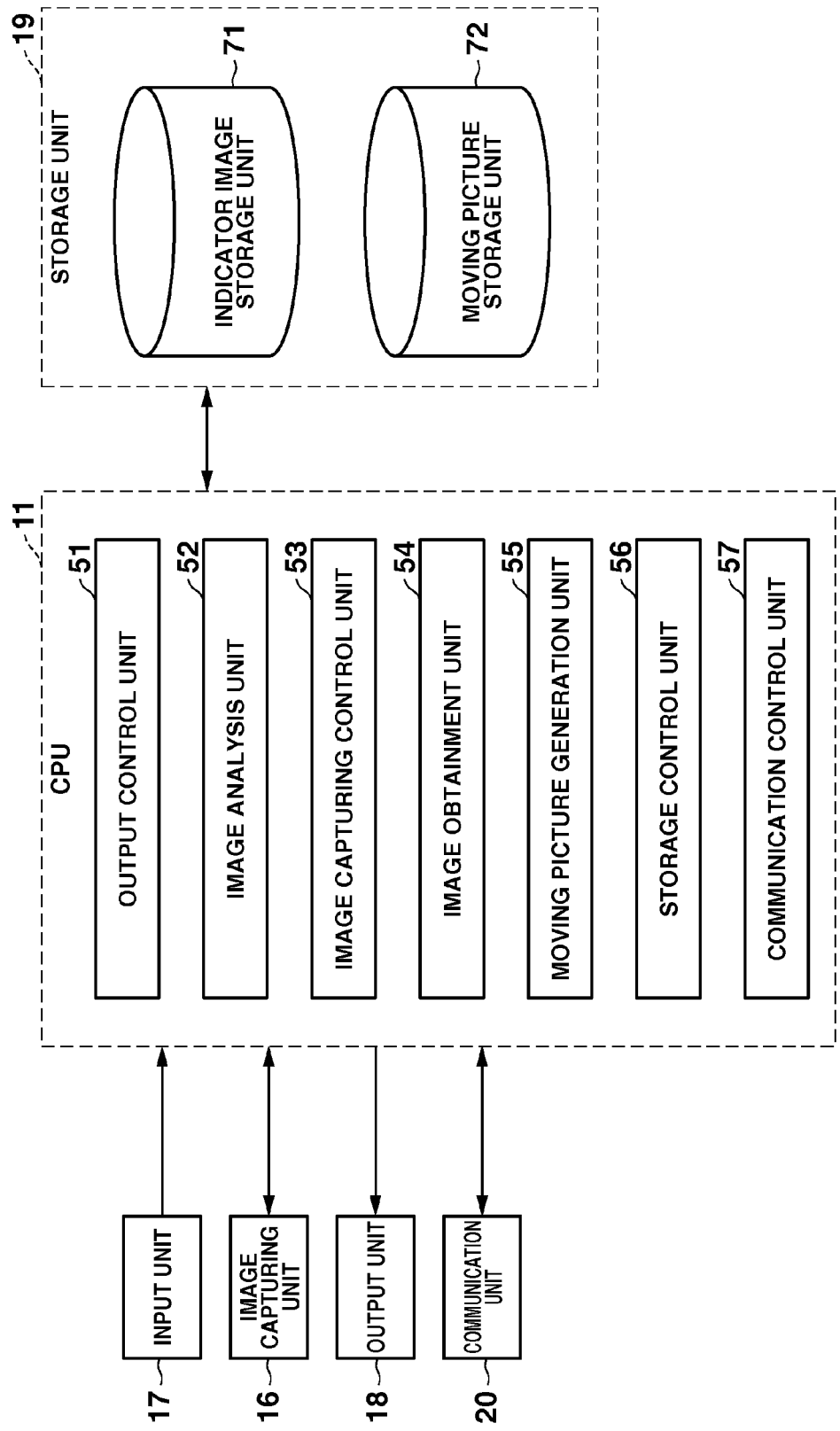
FIG. 2 is a function block diagram illustrating, of the functional configurations of the image capturing apparatus illustrated in FIG. 1, a functional configuration for executing a moving picture storage process.

FIG. 2 is a function block diagram illustrating a functional configuration, of the functional configurations of the image capturing apparatus 1, for executing a moving picture storage process.

The "moving picture storage process" is a series of processes in which a high-speed moving picture is stored in the automatic movie cut mode, the moving picture is cut to a period of the predetermined action, and after this, the playback icon or the sending icon is displayed and the high-speed moving picture is played back or sent.

When the moving picture storage process is executed, an output control unit 51, an image capturing control unit 52, an image analysis unit 53, an image obtainment unit 54, a moving picture generation unit 55, a storage control unit 56, and a communication control unit 57 operate within the CPU 11, as illustrated in FIG. 2.

In addition, an indicator image storage unit 71 and a moving picture storage unit 72 are set in a region of the storage unit 19.

Various types of indicator images displayed overlapping with a live view image are stored in the indicator image storage unit 71. Specifically, images such as the grid image, the moving picture storage icon, the playback icon, the sending icon, or the like are stored. Note that in the present embodiment, the grid image is assumed to correspond to the shape of the head of a golf club.

Moving picture data obtained from the image capturing unit 16, high-speed moving picture data after cutting in the moving picture storage process, and the like are stored in the moving picture storage unit 72.

The output control unit 51 controls the output unit 18 to display the live view image along with the indicator image, stored in the indicator image storage unit 71, on the live view image. As a result, the live view image and an indicator on that live view image are displayed in the output unit 18, and as will be described later, upon the indicator image overlapping with the image of the subject (for example, a golf club, a person's hand, or the like) shown in the live view image, an instruction to start storing the moving picture, an instruction to send the moving picture to an external device, or the like can be made.

Meanwhile, when the high-speed moving picture is to be played back in the image capturing apparatus 1, the output control unit 51 thins out the frames of the high-speed moving picture (a framerate of 1000 fps here) and plays back the moving picture at a lower framerate (30 fps, for example). Note that when a user wishes to confirm the high-speed moving picture in detail, the high-speed moving picture can be played back at its original framerate by sending the high-speed moving picture to a smartphone, a PC, or the like and playing the moving picture back.

The image capturing control unit 52 controls the image capturing unit 16 to carry out an image capturing process in accordance with various types of image capturing modes set by the user. In the present embodiment, when the high-speed moving picture is stored in the moving picture storage process, the high-speed moving picture is stored only for a range that is smaller than an image capturing range of the live view image (for example, a range limited to the vicinity of a central area). This lightens the processing load on the image capturing apparatus 1.

The image analysis unit 53 analyzes the live view image sequentially outputted from the image capturing unit 16 and determines whether or not the subject image overlaps with the position where the indicator image is displayed. To be more specific, the image analysis unit 53 determines whether or not the subject image is overlapping on the basis of a change occurring in the live view image (the live view image in the background of the indicator image) in a region where the indicator image is displayed.

In other words, whether or not the subject image overlaps with the position where the indicator image is displayed can be determined by comparing adjacent pieces of frame image data in a plurality of pieces of frame image data that constitute moving picture data, and identifying changes in pixel values between frame image data in which the subject (the head of a golf club or the like) is not present in the region where the indicator image is displayed and frame image data in which the subject is present in the region where the indicator image is displayed.

To be more specific, when the total of difference values between pixel values of regions in which the indicator image is displayed in adjacent frame image data is greater than or equal to a threshold, if the total is greater than or equal to the threshold, the subject can be assumed to be present in the region where the indicator image is displayed. Specifically, in the present embodiment, a sum of squared differences (SSD) (called an "evaluation value" hereinafter) is calculated from difference values between luminance values of the pixels in the region where the indicator image is displayed, and the subject is assumed to be present in the region where the indicator image is displayed when the evaluation value is greater than or equal to the threshold.

Note that the threshold used at this time can be determined from an average value, calculated in a predetermined period, of the difference values between pieces of the frame image data that have been calculated in a state where the subject is not present in the region where the indicator image is displayed (a timing at which the image capturing apparatus 1 is calibrated after being set up or the like).

The image obtainment unit 54 obtains images outputted from the image capturing unit 16 as frame images that constitute the moving picture, as a moving picture to be processed that is stored in the moving picture storage unit 72 (called a "processing target moving picture" hereinafter), and the like.

The moving picture generation unit 55 generates a moving picture by carrying out predetermined processing on the frame image data obtained sequentially from the image capturing unit 16 (for example, "moving picture cutting" in which a moving picture is partially cut from the stored high-speed moving picture, such as a frame image in which the subject image overlaps with the grid image or a frame image in which a specific activity range of the subject (from the address to the finish, for example) is stored, "image processing" such as a white balance adjustment process, a compression process, or the like, and the like). Note that in the automatic movie cut mode, it is possible to set whether or not to automatically cut the moving picture, and when the moving picture is not to be cut automatically, the moving picture generation unit 55 generates the moving picture by performing image processing only.

The storage control unit 56 causes the moving picture data generated by the moving picture generation unit 55 to be stored in the moving picture storage unit 72, the removable medium 31, and the like. In addition, the storage control unit 56 causes the moving picture data outputted from the image capturing unit 16 to be stored in the moving picture storage unit 72.

The communication control unit 57 controls the communication unit 20 so that the processing target moving picture obtained by the image obtainment unit 54 is sent to the external device.

Figure 3:
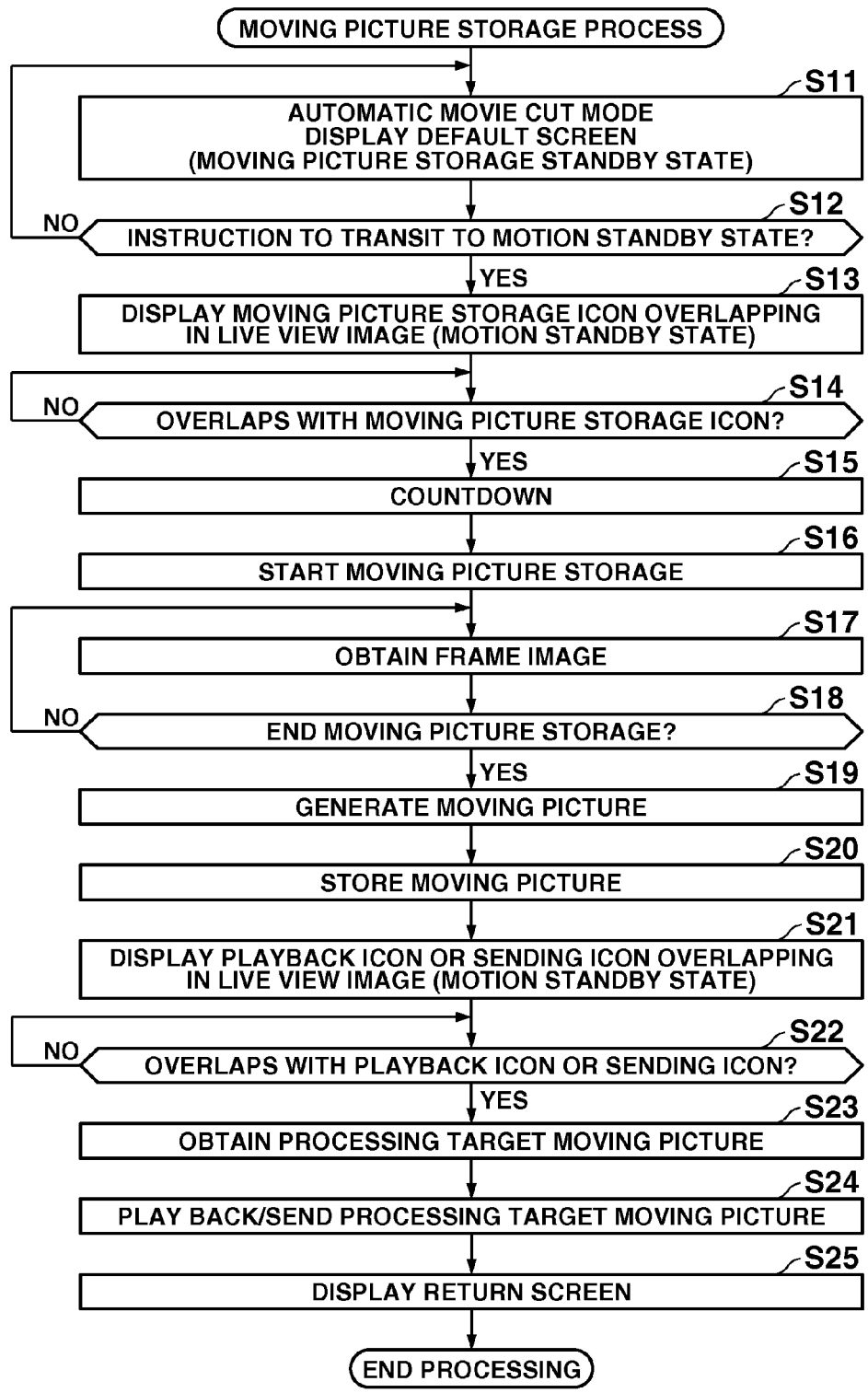
FIG. 3 is a flowchart illustrating the flow of the moving picture storage process executed by the image capturing apparatus illustrated in FIG. 1 having the functional configuration illustrated in FIG. 2.

FIG. 3 is a flowchart illustrating the flow of the moving picture storage process executed by the image capturing apparatus 1 illustrated in FIG. 1 having the functional configuration illustrated in FIG. 2. Before the moving picture storage process is started, a post-moving picture storage processing mode is set (in the present embodiment, one of the "moving picture playback mode" that plays back the moving picture or the "moving picture sending mode" that sends the generated moving picture to the external device after the moving picture has been generated).

Figure 4:
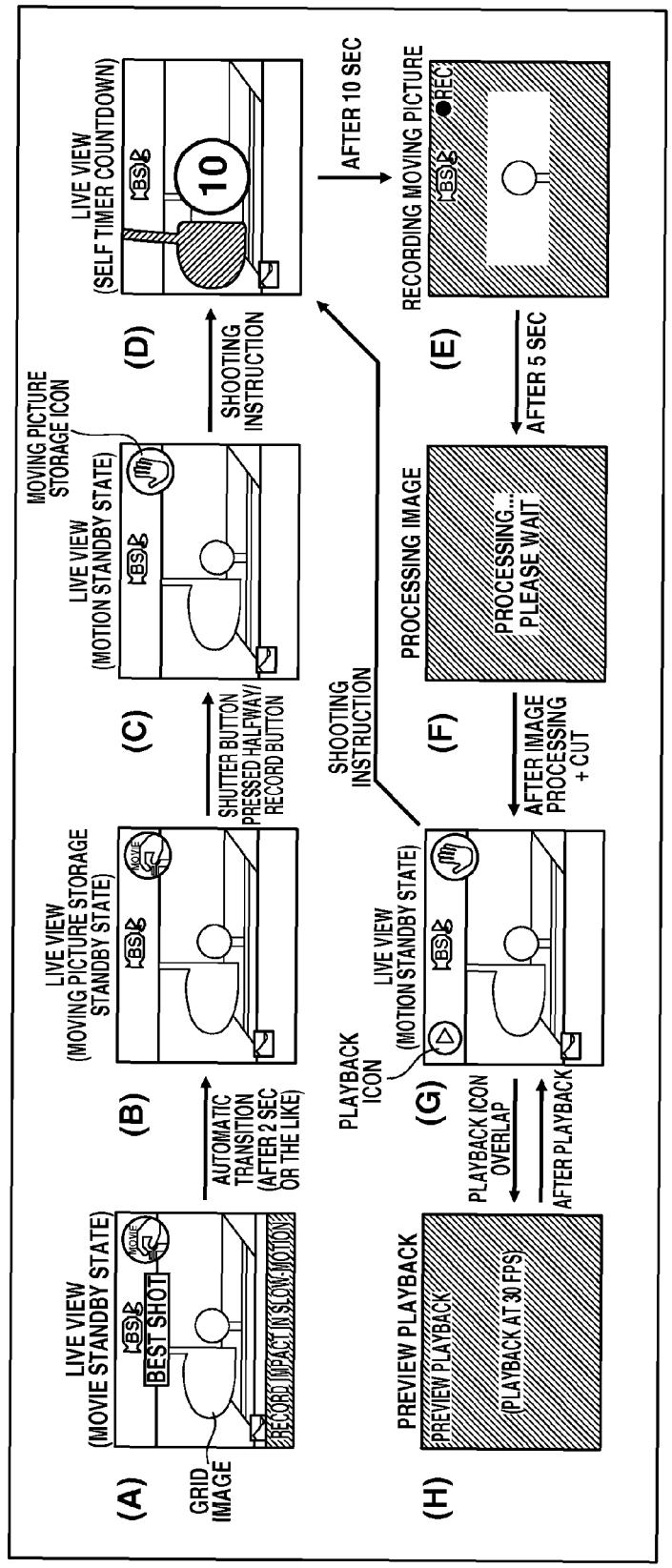
FIG. 4 is a schematic diagram wherein (A) to (H) illustrate an example of display screen transitions in a moving picture playback mode.
Figure 5:
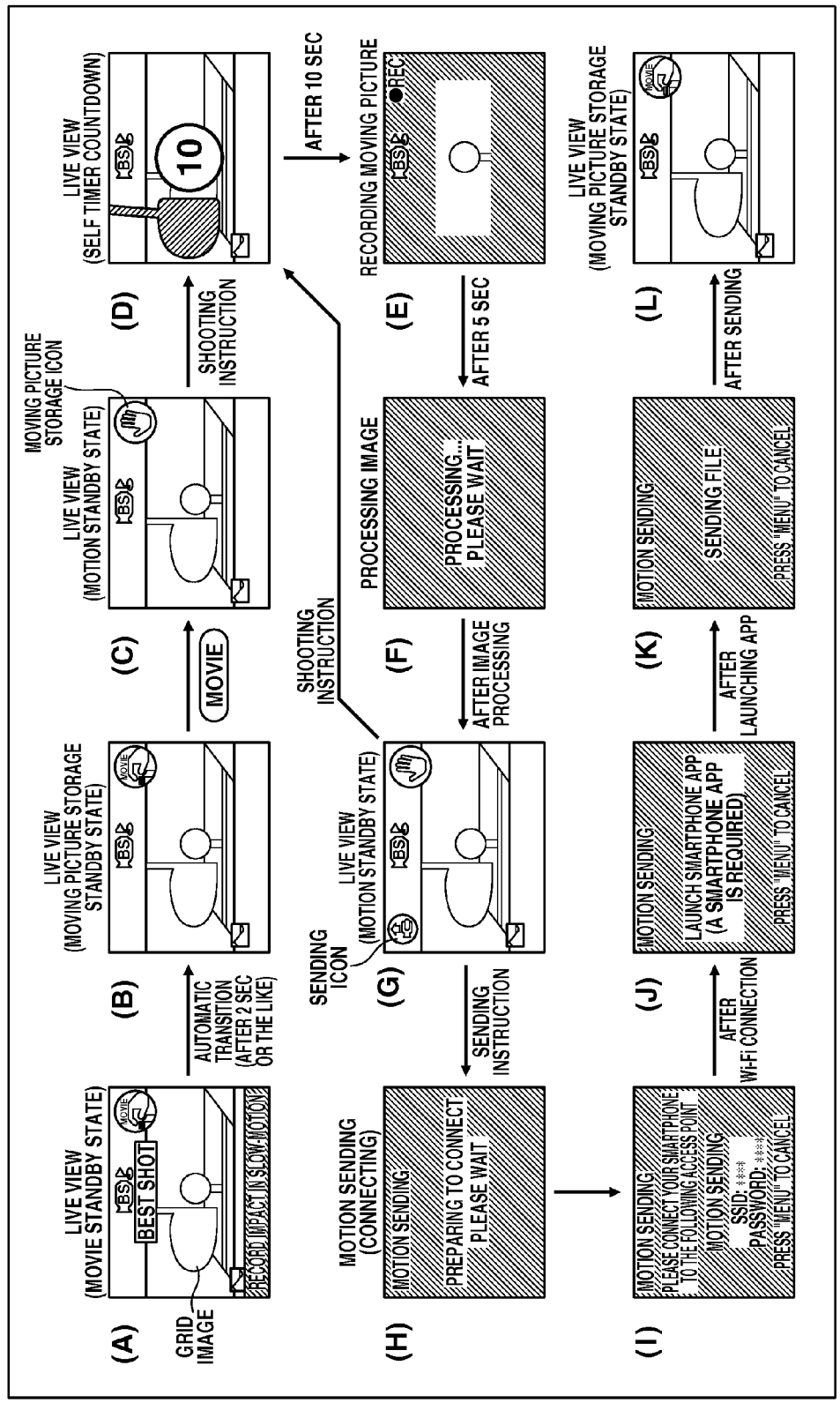
FIG. 5 is a schematic diagram wherein (A) to (L) illustrate an example of display screen transitions in a moving picture sending mode.

FIG. 4 is a schematic diagram, wherein (A) through (H) illustrate an example of display screen transitions in the moving picture playback mode. FIG. 5, meanwhile, is a schematic diagram, wherein (A) through (L) illustrate an example of display screen transitions in the moving picture sending mode. Hereinafter, the flow of the moving picture storage process will be described with reference to FIG. 4, (A) to (H), and FIG. 5, (A) to (L), as appropriate.

The moving picture storage process is started by the user making an operation to start the moving picture storage process through the input unit 17.

In step S11, the output control unit 51 controls the output unit 18 to display a default screen for the automatic movie cut mode (see FIGS. 4, (B), and 5, (B)) as a moving picture storage standby state.

In step S12, the image capturing control unit 52 determines whether or not the user has made an instruction to transit to a motion standby state (a state in which a storage instruction can be made using a gesture) by pushing the shutter button halfway, or by pressing a record button, which correspond to the input unit 17.

When an instruction to transit to the motion standby state has not been made, a determination of NO is made in step S12, and the process returns to step S11.

On the other hand, when an instruction to transit to the motion standby state has been made, a determination of YES is made in step S12, and the process advances to step S13.

In step S13, the output control unit 51 controls the output unit 18 to display the moving picture storage icon overlapping with the live view image obtained from the image capturing unit 16, as the motion standby state. As a result, a screen in which the moving picture storage icon is displayed overlapping with the live view image is displayed in the output unit 18, as illustrated in FIGS. 4, (C), and 5, (C).

In step S14, the image analysis unit 53 determines whether or not the moving picture storage icon overlaps with the image of the subject.

When the moving picture storage icon does not overlap with the image of the subject, a determination of NO is made in step S14, and the process of step S14 is repeated.

On the other hand, when the moving picture storage icon overlaps with the image of the subject, a determination of YES is made in step S14, and the process advances to step S15.

In step S15, the image capturing control unit 52 counts down until the start of moving picture storage (ten seconds, in the present embodiment). At this time, the output control unit 51 controls the output unit 18 to carry out a countdown display. As a result, the output unit 18 carries out a countdown display as illustrated in FIGS. 4, (D), and 5, (D).

In step S16, the image capturing control unit 52 controls the image capturing unit 16 to start the moving picture storage. At this time, the output control unit 51 controls the output unit 18 to carry out a display indicating that a moving picture is being stored. As a result, the output unit 18 carries out a display indicating that a moving picture is being stored, as illustrated in FIGS. 4, (E), and 5, (E).

In step S17, the image obtainment unit 54 obtains the image outputted from the image capturing unit 16 as a frame image that constitutes the moving picture.

In step S18, the image capturing control unit 52 determines whether or not to end the moving picture storage. Specifically, it is determined whether or not a predetermined amount of time (five seconds, here) has elapsed following the start of the moving picture storage.

When the moving picture storage is not to be ended, a determination of NO is made in step S18, and the process returns to step S17.

On the other hand, when the moving picture storage is to be ended, a determination of YES is made in step S18, and the process advances to step S19. At this time, the image capturing control unit 52 controls the image capturing unit 16 to end the moving picture storage.

In step S19, the moving picture generation unit 55 generates a moving picture from the images obtained by the image obtainment unit 54 as frame images. At this time, the output control unit 51 controls the output unit 18 to carry out a display indicating that image processing is underway. As a result, the output unit 18 carries out a display indicating that image processing is underway, as illustrated in FIGS. 4, (F), and 5, (F).

In step S20, the storage control unit 56 causes the moving picture generated by the moving picture generation unit 55 to be stored in the moving picture storage unit 72. Meanwhile, at this time, the moving picture generated by the moving picture generation unit 55 is also stored in the removable medium 31.

In step S21, the output control unit 51 controls the output unit 18 to display the playback icon or the sending icon overlapping with the live view image obtained from the image capturing unit 16. As a result, a screen in which the playback icon or the sending icon is displayed overlapping with the live view image is displayed in the output unit 18, as illustrated in FIGS. 4, (G), and 5, (G).

In step S22, the image analysis unit 53 determines whether or not the playback icon or the sending icon overlaps with the image of the subject.

When the playback icon or the sending icon does not overlap with the image of the subject, a determination of NO is made in step S22, and the process of step S22 is repeated.

On the other hand, when the playback icon or the sending icon overlaps with the image of the subject, a determination of YES is made in step S22, and the process advances to step S23.

In step S23, the image obtainment unit 54 obtains the moving picture stored in the moving picture storage unit 72 by the storage control unit 56 as the processing target moving picture.

In step S24, the communication control unit 57 or the output control unit 51 controls, on the basis of the post-moving-picture-storage processing mode settings, the output unit 18 to play back the processing target moving picture or the communication unit 20 to send the processing target moving picture to the external device. At this time, the output control unit 51 controls the output unit 18 to perform a preview playback display or a display for sending preparation. As a result, the preview playback display illustrated in FIG. 4, (H), or the display for the sending preparation for the moving picture illustrated in FIG. 5, (H) to (K), are performed in the output unit 18. Note that in the moving picture sending mode, predetermined preparations for reception are carried out in the external device, which is the destination of the processing target moving picture, as illustrated in FIG. 5, (H) to (K).

In step S25, the output control unit 51 controls the output unit 18 to display a return screen. As a result, in the output unit 18, a return screen such as the return screen illustrated in FIGS. 4, (G), and 5, (L), is displayed.

The moving picture storage process then ends.

The image capturing apparatus 1 configured as described thus far includes the image capturing unit 16, the image analysis unit 53, the storage control unit 56, the output control unit 51, the storage unit 19, the output unit 18, and the communication control unit 57 or the output control unit 51.

The image capturing unit 16 continuously captures an image of a subject and sequentially outputs image data.

The image analysis unit 53 determines whether or not there is an instruction regarding storage of the image data outputted by the image capturing unit 16 in the storage unit 19.

The storage control unit 56 carries out control to store the image data outputted from the image capturing unit 16 in the storage unit 19 upon the image analysis unit 53 determining that there is an instruction regarding storage in the storage unit 19.

In response to the instruction regarding storage, the output control unit 51 carries out control to display, in the output unit 18, the live view image corresponding to the image data sequentially outputted by the image capturing unit 16 along with the indicator image for processing the image data stored in the storage unit 19.

The image analysis unit 53 determines whether or not a position of the image of the subject in the live view image displayed in the output unit 18 by the output control unit 51 overlaps with a position of the indicator image for processing the image data.

The communication control unit 57 or the output control unit 51 carries out the predetermined processing on the image data stored in the storage unit 19 when the image analysis unit 53 has determined that the position of the image of the subject overlaps with the position of the indicator image for processing the image data.

Through this, when the instruction regarding storage of the image data has been made, the indicator image for processing the image data is displayed along with the live view image after the image data has been obtained. Then, when the image of the subject overlaps at the position of the indicator image for processing the image data, the predetermined processing is carried out on the image data stored in the storage unit 19.

Accordingly, by causing an image of the user's hand, a tool, or the like to overlap with the indicator image for processing the image data in the live view image, the user can cause the image capturing apparatus 1 to carry out the predetermined processing.

As such, in the image capturing apparatus 1, an operation for causing the apparatus to carry out desired control can be simplified.

As the predetermined processing, the communication control unit 57 controls the image data stored in the storage unit 19 by the storage control unit 56 to be sent to the exterior.

Through this, in the image capturing apparatus 1, an operation for causing the image data to be sent to the exterior can be simplified.

As the predetermined processing, the output control unit 51 carries out control for causing the image data stored in the storage unit 19 by the storage control unit 56 to be displayed in the output unit 18.

Through this, in the image capturing apparatus 1, an operation for causing the image data to be displayed in the output unit 18 can be simplified.

Meanwhile, the image capturing apparatus 1 further includes the output control unit 51 that carries out control for causing the live view image and the indicator image for making an instruction regarding storage to be displayed in the output unit 18.

The image analysis unit 53 determines whether or not an instruction regarding storage of the image data in the storage unit 19 has been made by determining whether or not the position of the image of the subject in the live view image displayed in the output unit 18 by the output control unit 51 and the position of the indicator image for the instruction regarding storage overlap.

Through this, the user can make the instruction regarding storage by causing an image of the user's hand, a tool, or the like to overlap with the indicator image for the instruction regarding storage in the live view image.

As such, in the image capturing apparatus 1, an operation for causing the apparatus to carry out desired control can be simplified.

The output control unit 51 carries out control for causing the indicator image for the instruction regarding storage to be displayed in the output unit 18 along with the indicator image for processing the image data.

The image analysis unit 53 determines whether or not an instruction regarding storage of the image data in the storage unit 19 has been made by determining whether or not the position of the image of the subject in the live view image and the position of the indicator image for the instruction regarding storage have overlapped.

Through this, the user can process the image data or make the instruction regarding storage by causing an image of the user's hand, a tool, or the like to overlap with the indicator image for processing the image data or the indicator image for the instruction regarding storage in the live view image.

As such, in the image capturing apparatus 1, an operation for causing the apparatus to carry out desired control can be simplified.

Meanwhile, the image capturing apparatus 1 further includes the image obtainment unit 54 that obtains the image data stored in the storage unit 19 by the storage control unit 56.

In response to the image data having been obtained by the image obtainment unit 54, the output control unit 51 carries out control to display, in the output unit 18, the live view image corresponding to the image data sequentially outputted by the image capturing unit 16 along with the indicator image for processing the image data stored in the storage unit 19, as the instruction regarding storage.

Through this, in response to the image data having been obtained by the image obtainment unit 54, the image capturing apparatus 1 can display, in the output unit 18, the live view image corresponding to the image data sequentially outputted by the image capturing unit 16 along with the indicator image for processing the image data stored in the storage unit 19.

As such, in the image capturing apparatus 1, an operation for causing the apparatus to carry out desired control when displaying the live view image and the indicator image in the output unit 18 can be simplified.

Note that the present invention is not limited to the foregoing embodiment, and modifications, enhancements, and the like that fall within a scope in which the object of the present invention can be achieved are also included within the present invention.

In step S21 of FIG. 3 in the foregoing embodiment, a variety of timings can be considered, as needed, for the timing at which the playback icon or the sending icon is displayed in an overlapping manner as long as the display is carried out in direct or indirect response to the instruction regarding storage of a moving picture.

For example, displaying the playback icon or the sending icon in an overlapping manner in response to an instruction to store the moving picture in a storage medium, the obtainment of the frame images that constitute the moving picture ending, or the storage of the moving picture in the storage medium ending can be considered.

Although the foregoing embodiment describes the grid image as corresponding to the shape of the head of a golf club, the invention is not limited thereto. In other words, the grid image may correspond to the overall shape of the body of a player taking a swing.

Figure 6A:
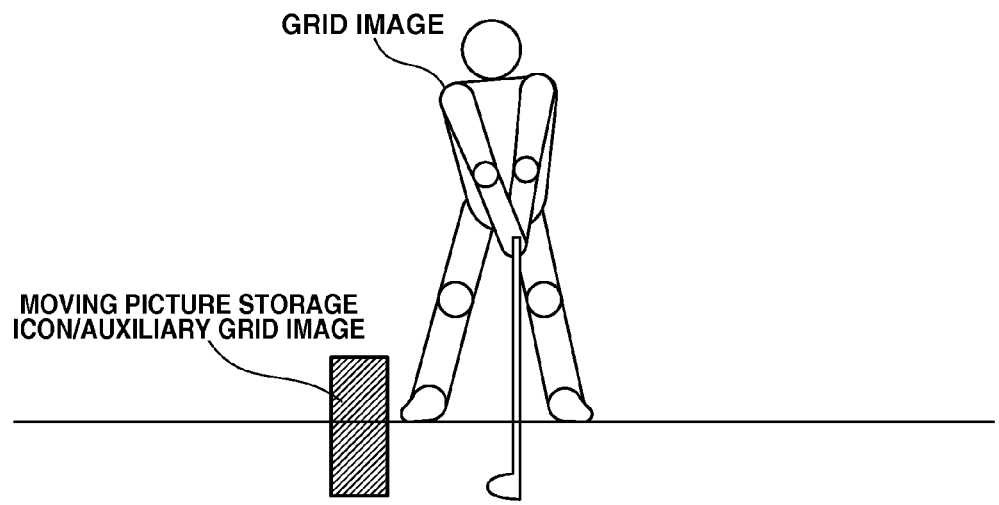
FIGS. 6A and 6B are diagrams illustrating an example of a grid image corresponding to the overall shape of the body of a player taking a swing.
Figure 6B:
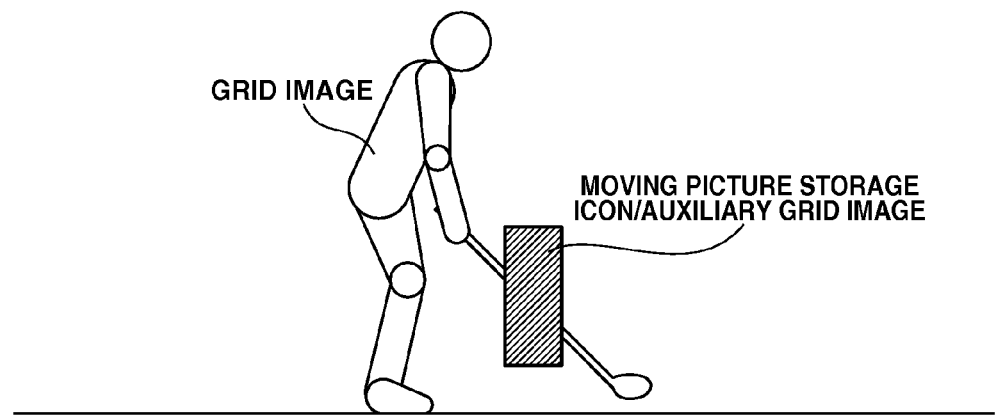

FIGS. 6A and 6B are diagrams illustrating an example of a grid image corresponding to the overall shape of the body of a player taking a swing.

As illustrated in FIGS. 6A and 6B, when the grid image is caused to correspond to the overall shape of the body of a player taking a swing, the grid image can correspond to the shape when viewing the player from the front of the player's body, as indicated in FIG. 6A, or the grid image can correspond to the shape when viewing the player from the rear in the direction in which the ball is hit, as indicated in FIG. 6B, and the like.

By varying the shape of the grid image in this manner, the user can store various types of actions the user desires through a simple operation.

Note that when the grid image is caused to correspond to the overall shape of the body of a player taking a swing, the moving picture storage icon or an auxiliary grid image may be displayed over a trajectory of the player's swing, as indicated in FIG. 6A and FIG. 6B. Then, when an image of the entire body of the player taking a swing overlaps with the grid image and the image of the subject (the golf club, for example) overlaps with the moving picture storage icon or the auxiliary grid image, the high-speed moving picture may be stored for a set amount of time (five seconds, for example) after an amount of time set in a timer has elapsed (after ten seconds, for example).

In this case, the storage instruction is not carried out by the player simply addressing the ball, and thus the player can make the storage instruction at a more appropriate timing.

Although the foregoing embodiment describes generating a single moving picture and then sending the moving picture to the external device when in the moving picture sending mode, the invention is not limited thereto. That is, a process in which a plurality of moving pictures are generated and then collectively sent to the external device may be carried out. Through this, a process for sending a plurality of moving pictures to an external device can be carried out with ease.

In addition, although the foregoing embodiment describes returning to the moving picture storage standby state as the return screen when in the moving picture sending mode, the invention is not limited thereto. For example, the motion standby state (see FIGS. 5, (C), and 5, (D)) may be returned to as the return screen. In this case, the moving picture can be re-shot, re-sent, or the like with ease.

In addition, in the foregoing embodiment, a moving picture that was not sent to the external device in the moving picture sending mode may be deleted from the image capturing apparatus 1. In other words, a moving picture that has been stored but not sent to the external device can be assumed to have little value to the user, and can thus be automatically deleted.

Through this, the burden of deleting unnecessary moving pictures can be lightened.

In addition, moving pictures sent to the external device may be left on the image capturing apparatus 1. Through this, moving pictures of high value to the user can be confirmed with ease on the image capturing apparatus 1 as well.

In addition, although the foregoing embodiment describes displaying the playback icon or the sending icon overlapping with the live view image after the moving picture is stored, the invention is not limited thereto. That is, before the moving picture is stored, the playback icon or the sending icon can be displayed in a state that cannot be manipulated, such as in a hatched or black-and-white display; then, once the cutting of the moving picture is complete after storage, the playback icon or the sending icon can be set to a state that can be manipulated by having the hatched display state canceled or being colored red or the like from the black-and-white state.

In addition, although the foregoing embodiment describes either the playback icon or the sending icon being displayed in accordance with whether the moving picture playback mode or the moving picture sending mode is active, the invention is not limited thereto. That is, both the playback icon and the sending icon may be displayed after the moving picture is stored.

In addition, although the foregoing embodiment describes a case where the present invention is applied for a moving picture, the invention is not limited thereto. That is, the present invention can be applied for still images. In this case, of a plurality of still images stored as a result of rapid shooting, still images stored during a specific period can be extracted or the like using a storage instruction made in response to a gesture as a trigger, for example.

In addition, although the foregoing embodiment describes a golf swing as an example of an action, the present invention can be applied when storing a variety of actions. For example, the present invention can be applied to the batting action in baseball, the action of swinging a tennis racket, or the like.

In addition, although the foregoing embodiment describes the image capturing apparatus 1 in which the present invention is applied as a digital camera as an example, the invention is not particularly limited thereto.

For example, the present invention can generally be applied in any electronic device having a function for storing moving pictures. For example, the present invention can be applied in a laptop personal computer, a video camera, a portable navigation device, a mobile telephone, a smartphone, a portable game device, and the like.

The aforementioned series of processes can be executed by hardware or can be executed by software.

To rephrase, the functional configuration illustrated in FIG. 2 is merely an example, and the invention is not particularly limited thereto. That is, as long as the image capturing apparatus 1 has functions that enable the overall aforementioned series of processes to be executed, which function blocks to use in order to realize those functions is not particularly limited to the example illustrated in FIG. 2.

Meanwhile, a single function block may be constituted of hardware only, software only, or of a combination thereof.

When the series of processes is executed by software, a program that constitutes that software is installed in a computer or the like from a network, a recording medium, or the like.

The computer may be a computer which is embedded into dedicated hardware. In addition, the computer may be a computer capable of executing various types of functions by installing various types of programs therein, such as a general personal computer, for example.

To provide such a program to a user, a recording medium including the program is not only constituted by the removable medium 31, illustrated in FIG. 1, which is distributed separately from the apparatus itself, but is also constituted by a recording medium or the like provided to the user pre-installed in the apparatus itself. The removable medium 31 is constituted of a magnetic disk (including a floppy disk), an optical disk, a magneto-optical disk, or the like, for example. The optical disk corresponds to a CD-ROM (Compact Disk-Read-Only Memory), a DVD (Digital Versatile Disk), a Blu-ray (registered trademark) disc (a Blu-ray Disk), or the like, for example.

A magneto-optical disk corresponds to an MD (Mini-Disk) or the like. Meanwhile, the recording medium provided to the user pre-installed in the apparatus itself corresponds to the ROM 12 illustrated in FIG. 1, in which the program is recorded, a hard disk included in the storage unit 19 illustrated in FIG. 1, or the like, for example.

Note that in the present specification, the steps written in the program recorded in the recording medium of course include processes carried out in that order in time series, as well as processes not necessarily carried out in time series but executed in parallel or individually.

Although several embodiments of the present invention have been described thus far, the embodiments are merely examples, and are not intended to limit the technical scope of the present invention. The present invention can take on a variety of other embodiments, and furthermore, many modifications, including omissions, replacements, and the like, can be made within a scope that does not depart from the principles of the present invention. Such embodiments and variations thereon fall within the scope and principles of the invention as set forth in the present specification and the like, and are likewise included in the inventions and equivalent scope as defined in the scope of patent claims.

What is claimed is:

1. An image processing apparatus comprising:
    an image capturing unit that continuously captures an image of a subject and sequentially outputs image data;
    a first determination unit that determines whether or not there is an instruction regarding storage of the image data in a storage unit;
    a storage control unit that carries out control to store the image data in the storage unit upon the first determination unit determining that there is an instruction regarding storage in the storage unit;
    a first display control unit that, in response to the instruction regarding storage, carries out control to display, in a display unit, a live view image corresponding to the image data sequentially outputted by the image capturing unit along with a first indicator image for performing predetermined processing on the image data, wherein the first indicator is on the live view image;
    a second determination unit that determines whether or not a position of the image of the subject in the live view image overlaps with a position of the first indicator image; and
    a processing unit that carries out the predetermined processing on the image data when the second determination unit has determined that the position of the image of the subject overlaps with the position of the first indicator image.

2. The image processing apparatus according to claim 1, wherein as the predetermined processing, the processing unit carries out control to send the image data to an exterior.

3. The image processing apparatus according to claim 1, wherein as the predetermined processing, the processing unit carries out control to display the image data in the display unit.

4. The image processing apparatus according to claim 1, further comprising a second display control unit that carries out control to display the live view image and a second indicator image for making the instruction regarding storage in the display unit,
    wherein the first determination unit determines whether or not an instruction regarding storage of the image data in the storage unit has been made by determining whether or not the position of the image of the subject in the live view image and a position of the second indicator image overlap.

5. The image processing apparatus according to claim 1, wherein:
    the first display control unit carries out control to display, in the display unit, a second indicator image along with the first indicator image; and
    the first determination unit determines whether or not an instruction regarding storage of the image data in the storage unit has been made by determining whether or not the position of the image of the subject in the live view image and a position of the second indicator image overlap.

6. The image processing apparatus according to claim 1, further comprising an obtainment unit that obtains the image data stored in the storage unit by the storage control unit,
    wherein in response to the image data having been obtained by the obtainment unit, the first display control unit carries out control to display, in the display unit, the live view image corresponding to the image data sequentially outputted by the image capturing unit along with the first indicator image, as the instruction regarding storage.

7. The image processing apparatus according to claim 1, wherein:
    in response to the instruction regarding storage, the first display control unit carries out control to display, in the display unit, the live view image corresponding to the image data sequentially outputted by the image capturing unit along with the first indicator image for carrying out the predetermined processing on the image data stored in the storage unit; and
    the processing unit carries out the predetermined processing on the image data stored in the storage unit when the second determination unit has determined that the position of the image of the subject overlaps with the position of the first indicator image.

8. An image processing method executed by an image processing apparatus including an image capturing unit that continuously captures an image of a subject and sequentially outputs image data, a storage unit, and a display unit, the method comprising:
- a first determination step of determining whether or not there is an instruction regarding storage of the image data outputted by the image capturing unit in the storage unit;
- a storage control step of carrying out control to store the image data in the storage unit upon it being determined in the first determination step that there is the instruction regarding storage in the storage unit;
- in response to the instruction regarding storage, a first display control step of carrying out control to display, in the display unit, a live view image corresponding to the image data sequentially outputted by the image capturing unit along with a first indicator image for performing predetermined processing on the image data, wherein the first indicator is on the live view image;
- a second determination step of determining whether or not a position of the image of the subject in the live view image overlaps with a position of the first indicator image; and
- a processing step of carrying out the predetermined processing on the image data when it has been determined in the second determination step that the position of the image of the subject overlaps with the position of the first indicator image.

9. The image processing method according to claim 8, wherein as the predetermined processing of the processing step, control is carried out to send the image data to an exterior.

10. The image processing method according to claim 8, wherein as the predetermined processing of the processing step, control is carried out to display the image data in the display unit.

11. The image processing method according to claim 8, further comprising a second display control step of carrying out control to display the live view image and a second indicator image for making the instruction regarding storage in the display unit,
- wherein in the first determination step, it is determined whether or not an instruction regarding storage of the image data in the storage unit has been made by determining whether or not the position of the image of the subject in the live view image and a position of the second indicator image overlap.

12. The image processing method according to claim 8, wherein:
- in the first display control step, control is carried out to display, in the display unit, a second indicator image along with the first indicator image; and
- in the first determination step, it is determined whether or not an instruction regarding storage of the image data in the storage unit has been made by determining whether or not the position of the image of the subject in the live view image and a position of the second indicator image overlap.

13. The image processing method according to claim 8, further comprising an obtaining step of obtaining the image data stored in the storage unit in the storage control step,
- wherein in response to the image data having been obtained in the obtaining step, in the first display control step, control is carried out to display, in the display unit, the live view image corresponding to the image data sequentially outputted by the image capturing unit along with the first indicator image, as the instruction regarding storage.

14. The image processing method according to claim 8, wherein:
- in response to the instruction regarding storage, in the first display control step, control is carried out to display, in the display unit, the live view image corresponding to the image data sequentially outputted by the image capturing unit along with the first indicator image for carrying out the predetermined processing on the image data stored in the storage unit; and
- in the processing step, the predetermined processing is carried out on the image data stored in the storage unit when it has been determined in the second determination step that the position of the image of the subject overlaps with the position of the first indicator image.

15. A non-transitory computer readable storage medium having a program stored thereon, the program being executable by a computer of an image processing apparatus that includes an image capturing unit that continuously captures an image of a subject and sequentially outputs image data, a storage unit, and a display unit, to perform functions comprising:
- a first determination function that determines whether or not there is an instruction regarding storage of the image data outputted by the image capturing unit in the storage unit;
- a storage control function that carries out control to store the image data in the storage unit upon the first determination function determining that there is the instruction regarding storage in the storage unit;
- a first display control function that, in response to the instruction regarding storage, carries out control to display, in the display unit, a live view image corresponding to the image data sequentially outputted by the image capturing unit along with a first indicator image, wherein the first indicator is on the live view image;
- a second determination function that determines whether or not a position of the image of the subject in the live view image overlaps with a position of the first indicator image; and
- a processing function that carries out the predetermined processing on the image data when the second determination function has determined that the position of the image of the subject overlaps with the position of the first indicator image.

16. The non-transitory computer readable storage medium according to claim 15, wherein as the predetermined processing, the processing function carries out control to send the image data to an exterior.

17. The non-transitory computer readable storage medium according to claim 15, wherein as the predetermined processing, the processing function carries out control to display the image data in the display unit.

18. The non-transitory computer readable storage medium according to claim 15, the functions further comprising a second display control function that carries out control to display the live view image and a second indicator image for making the instruction regarding storage in the display unit,
- wherein the first determination function determines whether or not an instruction regarding storage of the image data in the storage unit has been made by determining whether or not the position of the image of the subject in the live view image and a position of the second indicator image overlap.

19. The non-transitory computer readable storage medium according to claim 15, wherein:
- the first display control function carries out control to display, in the display unit, a second indicator image along with the first indicator image; and
- the first determination function determines whether or not an instruction regarding storage of the image data in the storage unit has been made by determining whether or not the position of the image of the subject in the live view image and a position of the second indicator image overlap.

20. The non-transitory computer readable storage medium according to claim 15, the functions further comprising an obtainment function that obtains the image data stored in the storage unit by the storage control function,
- wherein in response to the image data having been obtained by the obtainment function, the first display control function carries out control to display, in the display unit, the live view image corresponding to the image data sequentially outputted by the image capturing unit along with the first indicator image, as the instruction regarding storage.

\* \* \* \* \*